H. S. GREENE.
TRANSMISSION DEVICE.
APPLICATION FILED JULY 7, 1915.
1,157,098. Patented Oct. 19, 1915.
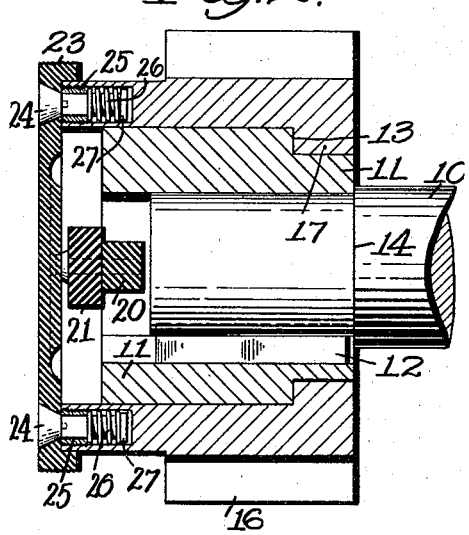
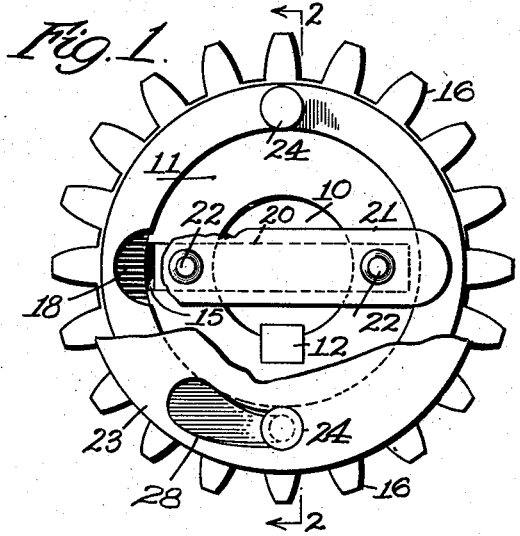
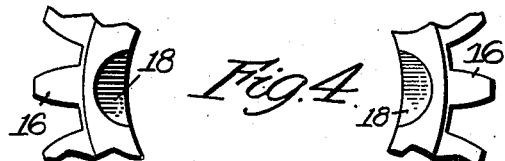
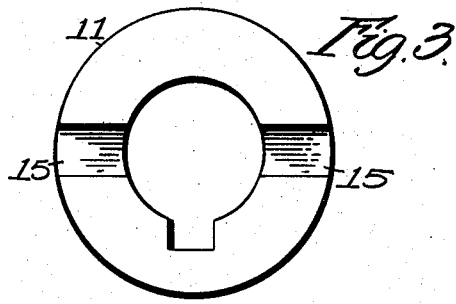
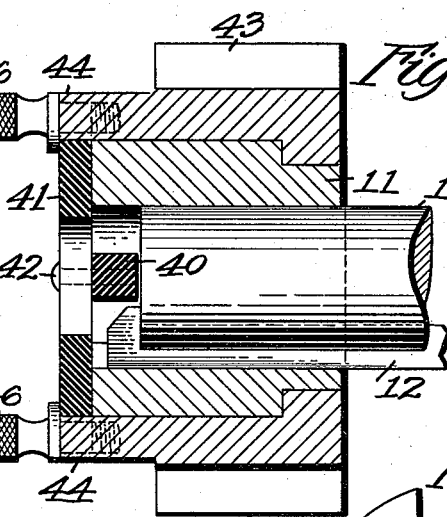
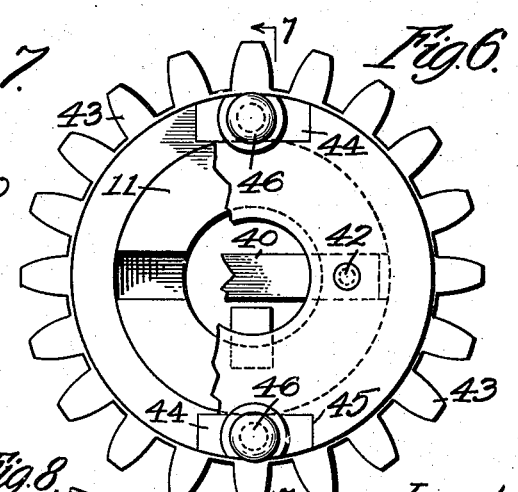

UNITED STATES PATENT OFFICE.

HARRY S. GREENE, OF WOONSOCKET, RHODE ISLAND, ASSIGNOR TO WOONSOCKET NAPPING MACHINERY COMPANY, OF WOONSOCKET, RHODE ISLAND, A CORPORATION OF RHODE ISLAND.

TRANSMISSION DEVICE.

1,157,098.  Specification of Letters Patent.  Patented Oct. 19, 1915.

Application filed July 7, 1915. Serial No. 38,530.

*To all whom it may concern:*

Be it known that I, HARRY S. GREENE, a citizen of the United States, residing at Woonsocket, in the county of Providence and State of Rhode Island, have invented a new and useful Transmission Device, of which the following is a specification.

This invention relates to a transmission device, and particularly to an improved form of safety device to be interposed between a driving and a driven member. This safety device is of general application but for purposes of illustration it is herein shown as embodied in the gear drive of the stripper brushes of a planetary napping machine. In this type of machine it occasionally happens that the cloth fed to the napping cylinder becomes entangled with the stripping brushes. To avoid serious damage to the machine it is then essential that the brush drive be instantly disconnected. It has been heretofore customary to attain this result by using a wooden key to connect the driving pinion to the brush driving shaft. This arrangement has served to protect the machine but has involved considerable labor and loss of time in the replacement of the key. Furthermore, the driving pinion when released by the shearing of the wooden key, has been free to work axially along the shaft as it continues to revolve thereon and thus often becomes entirely disconnected from the gears with which it is normally in mesh. This necessitates a careful readjustment of the machine to restore the two-armed brushes to their proper timed relation with the napping rolls.

It is the object of my invention to provide an improved form of safety device which shall avoid the disadvantages above outlined, the device being easily replaced and also effectively preventing axial movement of the pinion after its release by the action of the safety device.

With this object in view my invention relates to certain devices, arrangements and combinations of parts which will be hereinafter described and more particularly pointed out in the appended claims.

Two forms of my invention are shown in the drawings, in which—

Figure 1 is an end elevation of the brush driving mechanism of a napping machine, with my improved safety device embodied therein; Fig. 2 is a sectional side elevation taken along the line 2—2 in Fig. 1; Fig. 3 is an end elevation of the sleeve upon the driven shaft; Fig. 4 is a fragmentary end elevation of the driving pinion, showing the recesses for receiving the ends of one part of the compound key; Fig. 5 is a side elevation of the key; Fig. 6 is an end elevation of a modified form of my invention; Fig. 7 is a sectional side elevation taken along the line 7—7 in Fig. 6; and Fig. 8 is a detail view of a portion of the cover plate which forms one part of the compound key in this form of my invention.

Referring to the preferred form of my invention as shown in Figs. 1 to 5 inclusive, a driven shaft 10 is provided having a sleeve 11 rigidly mounted thereon and secured against relative angular movement by a key 12. The sleeve 11 is cut away at one end to provide a shoulder 13 and is positioned axially upon the shaft 10 by engagement with a shoulder 14 upon the shaft. The outer end of the sleeve extends beyond the end of the shaft 10 and is provided with oppositely-disposed transverse recesses 15, which constitute in effect a transverse keyway.

A driving pinion 16 is mounted to rotate upon the sleeve 11 and is provided with an inwardly projecting annular portion 17 which engages the shoulder 13 upon the sleeve and prevents axial movement of the pinion upon the sleeve in one direction. The outer end of the pinion extends beyond the end of the sleeve 11 and is provided with oppositely disposed recesses 18 for a purpose to be described.

For operatively connecting the driving pinion 16 to the sleeve 11 and the shaft 10, I provide a compound key (Fig. 5) formed of two parts 20 and 21 normally secured together by shearing pins 22 formed of brass or other soft metal. These pins may be freely inserted in the holes provided in the two parts of the key and may be secured therein by slightly heading over the inner ends of the pins.

The key when in use occupies the position shown in Figs. 1 and 2, with the portion 20 extending transversely in the recesses 15 in the outer end of the sleeve 11 and the portion 21 engaging the recesses 18 in the outer portion of the pinion 16.

The pinion is prevented from moving axially to the left (Fig. 2) by its engagement with the shoulder 13 as previously described, while to prevent axial movement in the opposite direction a cover plate 23 is provided. This plate is held in position by two plungers 24 having reverse conical heads which extend outwardly from the end surface of the pinion 16. The plungers are slidably mounted in screw-threaded collars 25, extending inwardly therethrough and each pressed inwardly by a coil spring 26 encircling the plunger between the collar 25 and a small shoulder or collar 27 secured to the inner end of the plunger.

Oppositely-disposed circumferential slots 28 are formed in the cover plate 23, the slots being of sufficient size at one end to permit the insertion of the conical heads of the plungers through the slots and converging toward the opposite end to engage the plunger and thereby prevent outward movement of the plate.

During the ordinary operation of the machine, power is transmitted from the pinion 16 through the parts 20 and 21 of the compound key to the sleeve 11, thereby rotating the shaft 10. Should free rotation of the shaft 10 be suddenly prevented by the engagement of a piece of cloth with one of the brushes or for any other reason, the sudden strain placed upon the driving mechanism will shear off the soft metal pins 22, thereby leaving the pinion 16 free to revolve upon the sleeve 11, while at the same time axial movement of the pinion is prevented by the shoulder 13 and by the cover plate 23. The pinion is thus free to revolve without doing further damage and is at the same time retained in proper axial position.

To restore the driving connection it is merely necessary to remove the cover plate 23 and insert a new compound key. These keys are of exceedingly simple construction and a sufficient number of spare keys may be easily kept in stock.

In the modified form shown in Figs. 6, 7 and 8, the construction is to some extent similar to that already described. The device however, is simplified by securing the key portion 40 directly to the cover plate 41 by shearing pins 42. The driving pinion 43 is provided with oppositely-disposed outwardly-extending lugs 44 which engage notches 45 (Fig. 8) in the cover plate 41. The cover plate is held in position by shoulder screws 46 threaded into the lugs 44. The operation of this device is substantially similar to that already described. The restoration of the parts to operative position involves the removal of the key 40 and plate 41 and the substitution of fresh parts therefor. It will thus appear that the construction in this form is somewhat simpler than that previously described but that the duplicate parts required are of somewhat larger size and correspondingly more expensive.

Having thus described my invention it will be evident that other changes and modifications can be made therein by those skilled in the art without departing from the spirit and scope thereof as set forth in the claims and I do not wish to be otherwise limited to the details herein disclosed, but

What I do claim is:—

1. A transmission device having, in combination, a driven member, a driving member rotatable thereon, and connections between said members, said connections comprising a compound key having one part engaging the driven member and a second part engaging the driving member, said parts being secured to each other by shearing pins of soft metal extending through said parts and secured therein.

2. A transmission device having, in combination, a driven member, a driving member rotatable thereon, and connections between said members, said connections comprising a two-part compound key extending transversely of the axis of rotation of said members and having the parts thereof held together by shearing pins, the two parts of said key each engaging transversely-disposed recesses in the end portions of said driven and said driving members respectively.

3. A transmission device having, in combination, a shaft, a shouldered sleeve fixed thereon, projecting beyond the end of said shaft and having a transverse keyway formed in the projecting portion thereof, a driving pinion rotatable on said sleeve and having an inwardly-projecting annular portion engaging the shoulder on said sleeve, thereby preventing relative axial movement of said pinion in one direction, and a cap plate secured to said pinion and preventing relative movement of the pinion and shaft in the opposite direction, said pinion projecting beyond the end of said sleeve, and having a pair of transversely-disposed recesses formed in its end portion, and said pinion and sleeve being relatively connected by a two-part compound key, one part thereof fitting the transverse keyway in said sleeve, and the second part engaging the transverse recesses in said pinion, the two parts of said key being secured to each other by soft metal shearing pins extending axially therethrough.

In testimony whereof I have hereunto set my hand, in the presence of two subscribing witnesses.

HARRY S. GREENE.

Witnesses:
 FRANCES L. COYLE,
 JAMES T. GREENE.

Copies of this patent may be obtained for five cents each, by addressing the "Commissioner of Patents, Washington, D. C."